(12) United States Patent
Toma

(10) Patent No.: US 10,534,504 B2
(45) Date of Patent: Jan. 14, 2020

(54) SALES DATA PROCESSING APPARATUS AND SALES DATA PROCESSING METHOD

(71) Applicant: CASIO COMPUTER CO., LTD., Shibuya-ku, Tokyo (JP)

(72) Inventor: Kazuyoshi Toma, Tokorozawa (JP)

(73) Assignee: CASIO COMPUTER CO., LTD., Tokyo (JP)

(*) Notice: Subject to any disclaimer, the term of this patent is extended or adjusted under 35 U.S.C. 154(b) by 232 days.

(21) Appl. No.: 15/192,927

(22) Filed: Jun. 24, 2016

(65) Prior Publication Data

US 2017/0090697 A1 Mar. 30, 2017

(30) Foreign Application Priority Data

Sep. 24, 2015 (JP) .................... 2015-186902

(51) Int. Cl.
| | |
|---|---|
| G06F 3/0482 | (2013.01) |
| G06F 3/0483 | (2013.01) |
| G06F 3/0484 | (2013.01) |
| G06F 3/0488 | (2013.01) |
| G06Q 30/06 | (2012.01) |
| G07G 1/00 | (2006.01) |

(52) U.S. Cl.
CPC ......... *G06F 3/0482* (2013.01); *G06F 3/0483* (2013.01); *G06F 3/0484* (2013.01); *G06F 3/0488* (2013.01); *G06Q 30/0641* (2013.01); *G07G 1/0009* (2013.01)

(58) Field of Classification Search
CPC .. G06Q 20/20; G06Q 30/0641; G07G 1/0009; G06F 3/0482; G06F 3/0484; G06F 3/0483; G06F 3/0488
See application file for complete search history.

(56) References Cited

U.S. PATENT DOCUMENTS

| | | | |
|---|---|---|---|
| 6,707,476 B1* | 3/2004 | Hochstedler | G06F 19/3418 715/789 |
| 7,886,048 B1* | 2/2011 | Holland | H04L 67/22 704/277 |

(Continued)

FOREIGN PATENT DOCUMENTS

| | | |
|---|---|---|
| EP | 2869251 A1 | 5/2015 |
| JP | 2010103919 A | 5/2010 |

(Continued)

OTHER PUBLICATIONS

Machine translation of JP2012-133813A retrieved from EPO on [Sep. 30, 2018]. 30 pages. (Year: 2012).*

(Continued)

*Primary Examiner* — Amy M Levy
(74) *Attorney, Agent, or Firm* — Holtz, Holtz & Volek PC

(57) ABSTRACT

A sales data processing apparatus includes the following. An operation unit is associated with a display and receives operation by touch. A setting unit associates an operator group with each operator according to a predetermined condition and associates a predetermined number of operator groups with each tab or each screen displayed on the display. A display control unit generates an operator selection screen to select the operator based on contents set by the setting unit and displays the operator selection screen on the display.

9 Claims, 5 Drawing Sheets

(56) References Cited

U.S. PATENT DOCUMENTS

| | | | | |
|---|---|---|---|---|
| 8,065,202 | B1* | 11/2011 | Ballaro | G06Q 10/087 705/27.2 |
| 8,706,692 | B1* | 4/2014 | Luthra | G06F 17/30575 707/622 |
| 8,799,806 | B2* | 8/2014 | Stallings | G06F 3/04812 715/777 |
| 9,020,884 | B2* | 4/2015 | Cullen, III | G06Q 10/10 705/7.12 |
| 2005/0006468 | A1 | 1/2005 | Fandel et al. | |
| 2006/0129978 | A1* | 6/2006 | Abrari | G06F 8/10 717/110 |
| 2006/0206834 | A1* | 9/2006 | Fisher | G06F 17/30528 715/777 |
| 2008/0163081 | A1* | 7/2008 | Gillette | G06F 17/30905 715/762 |
| 2009/0327947 | A1* | 12/2009 | Schreiner | G06F 3/0483 715/777 |
| 2010/0231355 | A1* | 9/2010 | Okuma | G06F 21/40 340/5.8 |
| 2011/0265179 | A1* | 10/2011 | Newman | G06F 21/604 726/22 |
| 2013/0086506 | A1* | 4/2013 | Molander | G06F 3/048 715/777 |
| 2013/0132854 | A1* | 5/2013 | Raleigh | G06F 3/0482 715/738 |
| 2013/0185674 | A1 | 7/2013 | Iwaki et al. | |
| 2014/0046786 | A1* | 2/2014 | Mazaheri | G07G 1/0081 705/18 |
| 2015/0025989 | A1* | 1/2015 | Dunstan | G06Q 20/20 705/18 |
| 2015/0088676 | A1* | 3/2015 | Elliott | G06Q 20/202 705/21 |
| 2015/0121550 | A1 | 4/2015 | Akita | |
| 2015/0262098 | A1* | 9/2015 | Kinsey | G06Q 10/10 705/7.38 |
| 2015/0288694 | A1* | 10/2015 | Liebl, III | G06F 21/31 713/182 |
| 2017/0228814 | A1* | 8/2017 | Harman | G06Q 30/0635 |

FOREIGN PATENT DOCUMENTS

| | | |
|---|---|---|
| JP | 4517931 B2 | 8/2010 |
| JP | 2010211631 A | 9/2010 |
| JP | 2012133813 A | 7/2012 |
| JP | 2015118512 A | 6/2015 |
| JP | 2015153373 A | 8/2015 |
| WO | 2004114056 A2 | 12/2004 |
| WO | 2012053213 A1 | 4/2012 |

OTHER PUBLICATIONS

Extended European Search Report (EESR) dated Feb. 23, 2017, issued in counterpart European Application No. 16176387.5.

Japanese Office Action dated Oct. 3, 2017 issued in counterpart Japanese Application No. 2015-186902.

Japanese Office Action dated Feb. 27, 2018 issued in counterpart Japanese Application No. 2015-186902.

Japanese Office Action dated Jun. 5, 2018 (and English language translation thereof) issued in counterpart Japanese Application No. 2015-186902.

* cited by examiner

FIG.2A

| OPERATOR CODE | OPERATOR NAME | GROUP CODE |
|---|---|---|
| 000011 | A | 0001 |
| 000113 | B | 0002 |
| 009001 | C | 1000 |
| 000301 | D | 0003 |
| 000114 | E | 0002 |
| 000310 | F | 0003 |
| 000012 | G | 0001 |
| 000122 | H | 0002 |
| 000123 | I | 0002 |
| 010001 | Z | 9000 |
| ⋮ | ⋮ | ⋮ |

FIG.2B

| GROUP CODE | GROUP NAME | DISPLAY PRIORITY | RESTRICTION ITEM |
|---|---|---|---|
| 0001 | GENERAL EMPLOYEE | — | RANGE POSSIBLE TO OPERATE UNDER GENERAL EMPLOYEE AUTHORITY |
| 0002 | PART-TIMER | — | RANGE POSSIBLE TO OPERATE UNDER PART-TIMER AUTHORITY |
| 1000 | STORE MANAGER | 1 | RANGE POSSIBLE TO OPERATE UNDER STORE MANAGER AUTHORITY |
| 0003 | MANAGER | 2 | RANGE POSSIBLE TO OPERATE UNDER MANAGER AUTHORITY |
| 9000 | MAINTENANCE | 3 | RANGE POSSIBLE TO OPERATE UNDER MAINTENANCE AUTHORITY |
| ⋮ | ⋮ | ⋮ | ⋮ |

FIG.2C

| TAB NAME | GROUP CODE | | |
|---|---|---|---|
| | CODE 1 | CODE 2 | CODE 3 |
| GENERAL EMPLOYEE | 0001 | — | — |
| PART-TIMER | 0002 | — | — |
| ADMINISTRATOR | 1000 | 0003 | 9000 |
| ⋮ | ⋮ | ⋮ | ⋮ |

SALES DATA PROCESSING APPARATUS AND SALES DATA PROCESSING METHOD

BACKGROUND OF THE INVENTION

1. Field of the Invention

The present invention relates to a sales data processing apparatus and a sales data processing method.

2. Background Art

Conventionally, a sales data processing apparatus such as an ECR (Electronic Cash Register) which performs sales registration of merchandise is known (for example, Japanese Patent No. 4517931, Japanese Patent Application Laid-Open Publication No, 2015-153373). The functions that can be operated on such sales data processing apparatus can be restricted by authority according to position such as part-timer, general employee, or store manager. That is, the operator of the sales data processing apparatus signs on when operating the sales data processing apparatus and the function of the sales data processing apparatus is restricted according to the authority of the operator who signed on.

For example, when the operator signs on, the operator operates the operator key corresponding to each operator displayed on the display screen formed as one with the touch panel of the sales data processing apparatus. Such operator key is positioned in a separate tab or screen for each position. When an operator who is newly hired or is newly positioned needs to be added, the authority of the operator needs to be associated and the operator key needs to be positioned. When an operator who resigns or leaves for a different position needs to be deleted, the authority associated to the operator needs to be canceled and the operator key needs to be deleted. Such troublesome work needs to be done when the operator is added or deleted.

SUMMARY OF THE INVENTION

The present invention is made in view of the above problems, and the purpose of the present invention is to easily generate a selection screen for the operator who operates the apparatus.

According to an aspect of the present invention, there is provided a sales data processing apparatus including: an operation unit which is associated with a display and which receives operation by touch by an operator; a setting unit which associates an operator group with each operator according to a predetermined condition and which associates a predetermined number of operator groups with each tab or each screen displayed on the display; and a display control unit which generates an operator selection screen to select the operator based on contents set by the setting unit and which displays the operator selection screen on the display.

According to an aspect of the present invention, there is provided a sales data processing method including; setting which associates an operator group with each operator according to a predetermined condition and which associates a predetermined number of operator groups with each tab or each screen displayed on a display; and displaying which generates an operator selection screen to select the operator based on contents set in the setting and which displays the operator selection screen on the display.

According to the present invention, a selection screen for the operator who operates the apparatus can be easily generated.

BRIEF DESCRIPTION OF THE DRAWINGS

FIG. 2A is a diagram showing an example of an operator setting table stored in the sales data processing apparatus shown in FIG. 1.

FIG. 2B is a diagram showing an example of a group setting table stored in the sales data processing apparatus shown in FIG. 1.

FIG. 2C is a diagram showing an example of a tab setting table stored in the sales data processing apparatus shown in FIG. 1.

DETAILED DESCRIPTION OF THE PREFERRED EMBODIMENTS

A detailed embodiment of the present invention is described with reference to the drawings. The scope of the invention is not limited to the illustrated examples.

For example, a sales data processing apparatus 100 is an ECR provided in a private store, retail store, restaurant, etc. The sales data processing apparatus 100 performs processes such as registering sales data of merchandise, setting a unit price of merchandise, etc. according to operation by the operator such as an employee.

First, the configuration of the sales data processing apparatus 100 is described.

Figure 1:
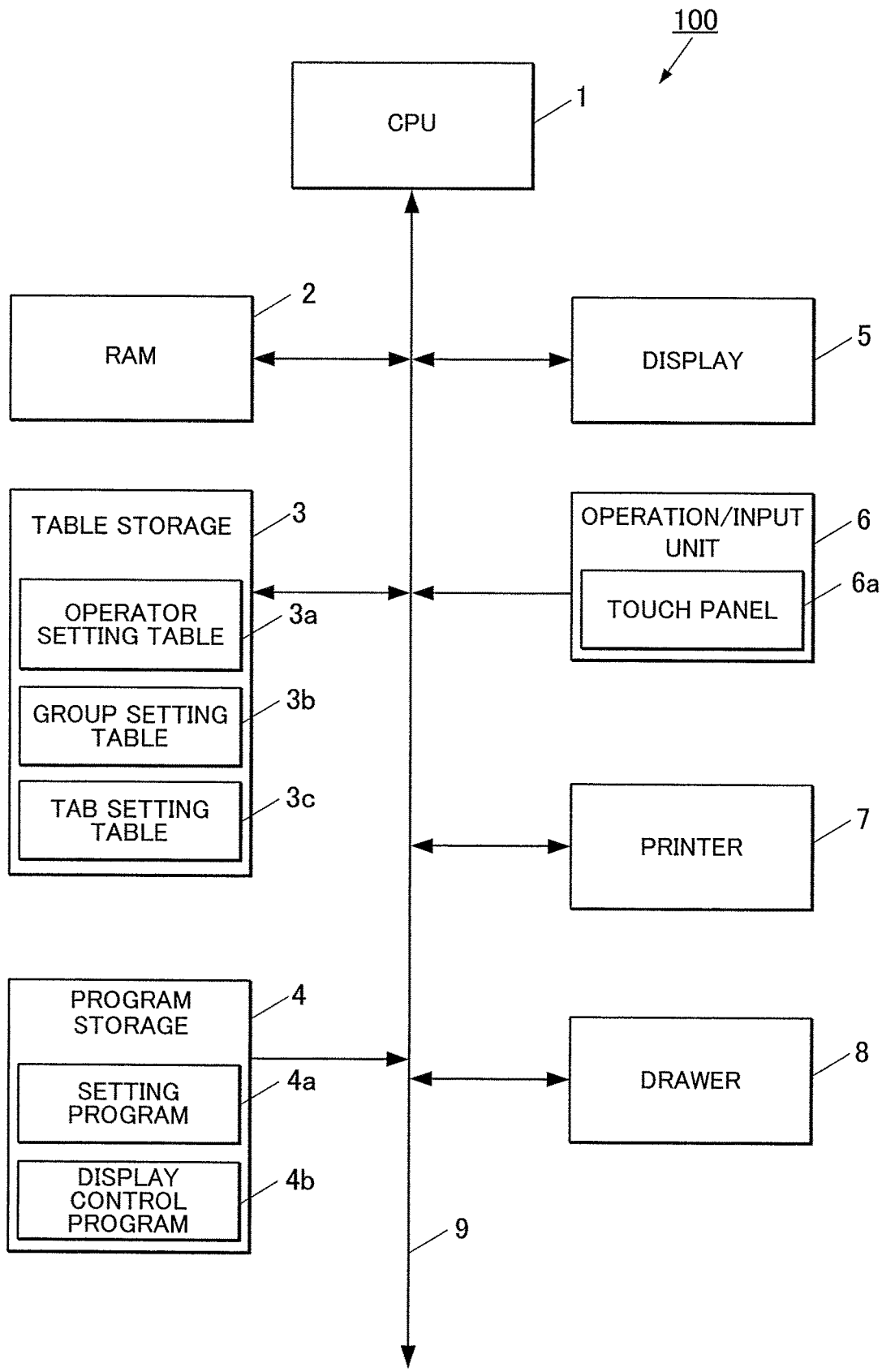
FIG. 1 is a block diagram showing a functional configuration of a sales data processing apparatus according to an embodiment of the present invention.

FIG. 1 is a block diagram showing a functional configuration of the sales data processing apparatus 100.

As shown in FIG. 1, the sales data processing apparatus 100 of the present embodiment includes a CPU 1, RAM 2, a table storage 3, a program storage 4, a display 5, an operation/input unit 6, a printer 7, and a drawer 8. Each unit of the sales data processing apparatus 100 is connected to each other through a bus 9.

The CPU (Central Processing Unit) 1 controls each unit of the sales data processing apparatus 100. The CPU 1 reads a specified program from a system program and application programs stored in the program storage 4, develops the program in a work area of the RAM 2, and performs various processing according to the program. Here, the CPU 1 stores various processing results in the RAM 2 and displays the result on the display 5 according to necessity.

The RAM (Random Access Memory) 2 is, for example, volatile memory and includes a work area in which various programs and pieces of data read from the CPU 1 temporarily stored.

The table storage 3 is storage which is able to read and write information, and examples include a flash memory, EEPROM (Electrically Erasable Programmable Read Only Memory), etc. The table storage 3 stores an operator setting table 3*a*, a group setting table 3*b*, and a tab setting table 3*c* (see FIG. 2A to FIG. 2C).

FIG. 2A is a diagram showing an example of an operator setting table 3*a*.

The operator setting table 3*a* is a table regarding setting of an operator group to which each operator belongs. Specifically, as shown in FIG. 2A, an "operator code" to identify each operator, an "operator name" which is the name of the operator, and a "group code" to identify each operator group are stored in the operator setting table 3a associated with each other.

For example, "000011" as the "operator code", "A" as the "operator name", and "0001" as the "group code" are associated with each other. Similarly, "000113" as the "operator code", "B" as the "operator name", and "0002" as the "group code" are associated with each other. Similarly, "009001" as the "operator code", "C" as the "operator name", and "1000" as the "group code" are associated with each other. Similarly, "000301" as the "operator code", "D" as the "operator name", and "0003" as the "group code" are associated with each other. Similarly, "000114" as the "operator code", "E" as the "operator name", and "0002" as the "group code" are associated with each other. Similarly, "000310" as the "operator code", "F" as the "operator name", and "0003" as the "group code" are associated with each other. Similarly, "000012" as the "operator code", "G" as the "operator name", and "0001" as the "group code" are associated with each other. Similarly, "000122" as the "operator code", "H" as the "operator name", and "0002" the "group code" are associated with each other. Similarly, "000123" as the "operator code", "I" as the "operator name", and "0002" as the "group code" are associated with each other. Similarly, "010001" as the "operator code", "Z" as the "operator name", and "9000" as the "group code" are associated with each other.

The contents of the above operator setting table 3a is one example and the present invention is not limited to the above. Suitable modifications can be made without leaving the scope of the invention.

FIG. 2B is a diagram showing an example of a group setting table 3b.

The group setting table 3b is a table regarding various setting of each operator group. Specifically, as shown in FIG. 2B, a "group code" to identify each operator group, a "group name" which is the name of the operator group, a "display priority" showing priority of display (smaller number for higher priority) in the operator selection screen G (see FIG. 3), and "restriction item" showing items restricted according to authority of each operator group regarding the operation of the sales data processing apparatus 100 are stored in the group setting table 3b associated with each other.

Specifically, for example, "0001" as the "group code"; "general employee" as the "group name"; and "range possible to operate under general employee authority" as "restriction item" are associated with each other. Similarly, "0002" as the "group code"; "part-timer" as the "group name"; and "range possible to operate under part-timer authority" as "restriction item" are associated with each other. Moreover, "1000" as the "group code"; "store manager" as the "group name"; "1" as the "display priority"; and "range possible to operate under store manager authority" as "restriction item" are associated with each other. Similarly, "0003" as the "group code"; "manager" as the "group name"; "2" as the "display priority"; and "range possible to operate under manager authority" as "restriction item" are associated with each other. Similarly, "9000" as the "group code"; "maintenance" as the "group name"; "3" as the "display priority"; and "range possible to operate under maintenance authority" as "restriction item" are associated with each other.

The "display priority" is a condition regarding the display such as display portion or display format of the operator key of the operator belonging to the operator group in the tab T in the operator selection screen G associated with the operator group. The higher the "display priority" is, for example, the operator key is displayed in a position of the tab T where selection is easy for the operator (for example, left side, upper side, etc.) or in a format which is easily identified by the operator (for example, with color, blinking, etc.).

The specific contents of the "restriction item" is defined according to position, examples including whether registration of return is allowed, whether change of price is allowed, whether credit payment can be received, etc. The contents are not limited to the above and suitable modification is possible.

The contents of the group setting table 3b are merely examples, and the present invention is not limited to the above. Suitable modifications can be made. For example, the "display priority" can be set for "general employee" and "part-timer". Specifically, for example, the "general employee" may be classified to "upper employee", "middle employee", and "temporal employee", and the "display priority" can be set for each classification.

FIG. 2C is a diagram showing an example of a tab setting table 3c.

The tab setting table 3c is a table regarding various setting for each tab T composing the operator selection screen G. Specifically, as shown in FIG. 2C, the tab setting table 3c stores the "tab name" which is the name of the tab T and the "group code" (for example, "code 1" to "code 3", etc.) to identify the predetermined number of operator groups corresponded to each tab T associated with each other.

For example, the "general employee" as the "tab name" and "0001" as "code 1" are associated with each other. Similarly, "part-timer" as the "tab name" and "0002" as "code 1" are associated with each other. Moreover, "administrator" as the "tab name" and "1000" as "code 1", "0003" as "code 2", and "9000" as "code 3" are associated with each other.

The contents of the tab setting table 3c are merely examples, and the present invention is not limited to the above. Suitable modifications can be made. For example, in the tab setting table 3c, one "group code" corresponding to the operator group is associated with the "general employee" and the "part-timer", however, this is merely one example, and two or more of the "group code" can be associated.

Moreover, for example, a maximum of 3 of the "group code" corresponding to the operator group can be associated with each tab T, however, this is merely one example, and the number of the "group code" that can be associated can be suitably changed.

The program storage 4 is a storage dedicated to reading information, and includes, for example, a ROM (Read Only Memory), etc. The program storage 4 stores a setting program 4a and display control program 4b.

The setting program 4a is a program to realize function of the setting process regarding setting to correspond each operator with the operator group and to associate the tab T composing the operator selection screen G with the predetermined number of operator groups.

The setting process is the process to register various information in the operator setting table 3a, the group setting table 3b, and the tab setting table 3c used in the selection screen display process (described later) which displays the operator selection screen G and to edit the registered contents.

Specifically, the CPU 1 reads the setting program 4a from the program storage 4, and performs at least one process specified by the user from the operator setting process, the group setting process, and the tab setting process according to the setting program. 4a. Here, the CPU 1 functions as the setting unit in coordination with the setting program 4a.

For example, the operator setting process is a process performed when an operator needs to be added to or deleted from the operator setting table 3a due to transfer of the operator, etc.

According to the operator setting process, the CPU 1 performs setting to associate the operator group to each operator according to a predetermined condition. In other words, as shown in the group setting table 3b (see FIG. 2B), the operator group is divided by authority according to position such as "general employee", "part-timer", "store manager", "manager", "maintenance", etc.

For example, when a new operator is added to the operator setting table 3a, the "operator code" (for example, "000011", etc.) of the new operator, the "operator name" which is the name of the new operator (for example, "A", etc.), and the "group code" of the operator group according to the position (for example, "0001" corresponding to "general employee", etc.) are input based on predetermined operation on the operation/input unit 6 by the user and registered in each column of the operator setting table 3a by the CPU 1.

For example, when an existing operator is deleted from the operator setting table 3a, based on predetermined operation of the operation/input unit 6 by the user, the CPU 1 deletes information in the "operator code", the "operator name", and the "group code" in each column for the operator to be deleted from the operator setting table 3a.

For example, the group setting process is a process performed when it is necessary to perform, for example, new registration (add) of an operator group in the group setting table 3b or to change (including delete) the setting information relating to the operator group registered in the group setting table 3b.

For example, in the group setting process, when the new operator group is added in the group setting table 3b based on the predetermined operation on the operation/input unit 6 by the user, the CPU 1 sets "group code", "group name", "display priority", and "restriction item" and registers the above in each column of the group setting table 3b for each operator group such as "general employee", "part-timer", "store manager", "manager", "maintenance", etc.

For example, when the setting information of the registered operator group is changed in the group setting table 3b, based on the predetermined operation of the operation/input unit 6 by the user, the CPU 1 specifies the column of the setting information to be changed from the columns such as "group code", "group name", "display priority", and "restriction item" of the operator group to be changed in the group setting table 3b, and changes the contents.

For example, the tab setting process is performed when the "tab name" set in the tab setting table 3c needs to be edited or the operator group associated with the "tab name" needs to be edited (added or deleted).

In the tab setting process, the CPU 1 performs setting to associate the predetermined number of operator groups to each tab T composing the operator selection screen G displayed on the display 5.

Specifically, for example, when the operator group associated with the "tab name" is added, based on predetermined operation on the operation/input unit 6 by the user, the CPU 1 sets the "group code" showing the operator group for each tab T with the "tab name" such as "general employee", "part-timer", "administrator", etc., and registers the above in each column of the tab setting table 3c.

That is, as one example, regarding the operator group such as "store manager", "manager", "maintenance", etc., among the columns in which the "tab name" corresponds to "administrator", the CPU 1 sets "1000" corresponding to "store manager" in "code 1", "0003" corresponding to "manager" in "code 2", and "9000" corresponding to "maintenance" in "code 3", so that the above operator groups are associated with the "tab name" (display name).

For example, when the setting information such as "tab name" and "group code" registered in the tab setting table 3c is changed, based on the predetermined operation on the operation/input unit 6 by the user, the CPU 1 specifies from the columns "tab name" and "group code" in the tab setting table 3c the column of the setting information to be changed and changes the contents.

The predetermined number of operator groups are associated to each tab T using the "tab name", but this is merely one example. The method of association can be suitably changed. That is, the predetermined number of operator groups associated with the tab T displayed on the display 5 does not always need to be corresponded with the "tab name" displayed in the tab T.

The display control program 4b is a program which realizes a function regarding the selection screen display process in which the operator selection screen G is generated and displayed on the display 5.

Specifically, the CPU 1 reads the display control program 4b from the program storage 4, and performs the selection screen display process according to the display control program 4b. Here, the CPU 1 functions as the display control unit in coordination with the display control program 4b.

For example, the selection screen display process is performed to display the operator selection screen G used for selection by the operator when the operator signs on to the sales data processing apparatus 100.

According to the selection screen display process, for example, the CPU 1 generates the operator selection screen G for selection by the operator who signs on (operates) the sales data processing apparatus 100 based on the contents set in the setting process according to predetermined operation on the operation/input unit 6 by the user, and displays the generated operator selection screen G on the display 5.

Figure 3:
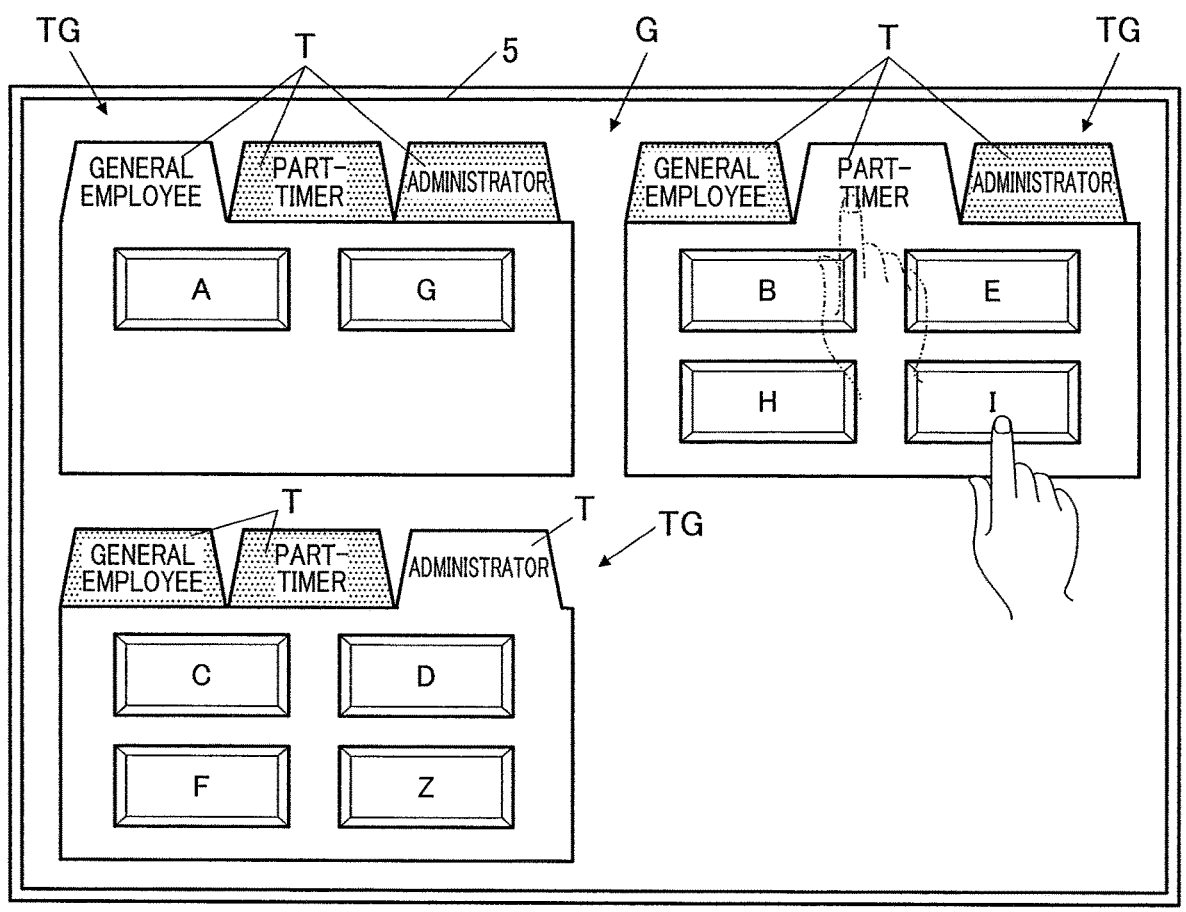
FIG. 3 is a diagram schematically showing an example of an operator selection screen of a selection screen display process by the sales data processing apparatus shown in FIG. 1.

Specifically, the CPU 1 reads the operator setting table 3a and the tab setting table 3c from the table storage 3 and generates the operator selection screen G with the operator key showing the operator composing the predetermined number of operation groups associated with each tab T composing the operator selection screen G in the setting process positioned in a predetermined order and displays the generated operator selection screen G on the display 5 (see FIG. 3).

Here, an example of the operator selection screen G is described with reference to FIG. 3.

FIG. 3 is an example of the operator selection screen G displayed on the display 5, and schematically shows a state in which the tab T with "part-timer" as the "tab name" is touched by the operator "1".

For example, in the operator selection screen G shown in FIG. 3, there are 3 tab groups TG including tabs T with "general employee", "part-timer", and "administrator" as the "tab name". The tabs T with "general employee", "part-timer", and "administrator" as the "tab name" are positioned in order from the left in each tab group TG.

The operator keys showing "A" and "G" who belong to "general employee" are positioned in the tab T with "general employee" as the "tab name" in the tab group TG in the top left. Since the "display priority" is not registered in the group setting table 3b in the "general employee" associated with the tab T, the operator keys are positioned in order from the top left to the top right from the operator key including the "operator code" with the smaller number.

In the tab T with "part-timer" as the "tab name" in the tab group TG in the upper right, the operator keys showing "B", "E", "H", and "I" who belong to "part-timer" are positioned. Similar to "general employee", the "display priority" is not registered in the group setting table 3b in the "part-timer" associated with the tab T, and the operator keys are positioned in order from the top left to the top right and then to the bottom left to bottom right from the operator key including the "operator code" with the smaller number.

In the tab T with "administrator" as the "tab name" in the tab group TG in the bottom left, the operator keys showing "C" who belongs to "store manager", "D" and "F" who belong to "manager", and "Z" who belongs to "maintenance" are positioned. Since the "display priority" is registered in the group setting table 3b for "store manager", "manager", and "maintenance" associated with the tab T, the operator keys are positioned in order from the top left to the top right and then to the bottom left to bottom right from the operator key including the "display priority" with the smaller number.

For example, the display 5 includes a display such as LCD (Liquid Crystal Display), organic EL (Electro-Luminescence) display, etc. The display 5 displays various screens according to an instruction of the input display signal output from the CPU 1.

The operation/input unit 6 is used for predetermined operation of the sales data processing apparatus 100. The operation/input unit 6 includes the touch panel (operation unit) 6a which is touched by the operator who operates the sales data processing apparatus 100.

The touch panel 6a is formed as one with the display 5, and for example, the XY coordinate of the position touched by the operator is detected on the display 5 by various methods such as capacitance method, resistance film method, and ultrasound surface elastic wave method. The touch panel 6a outputs to the CPU 1 the position signal regarding the XY coordinate of the touched position.

For example, the printer 7 includes a thermal printer and prints out a price or sales data on a rolled sheet of thermal paper for a receipt or for a journal according to an input instruction signal output from the CPU 1.

The drawer 8 includes a drawer storing cash such as coins and bills, and opens the drawer according to an input instruction signal output from the CPU 1. The opened drawer can be closed manually by the operator.

<Selection Screen Display Process>

Next, the selection screen display process by the sales data processing apparatus 100 is described with reference to FIG. 4.

Figure 4:
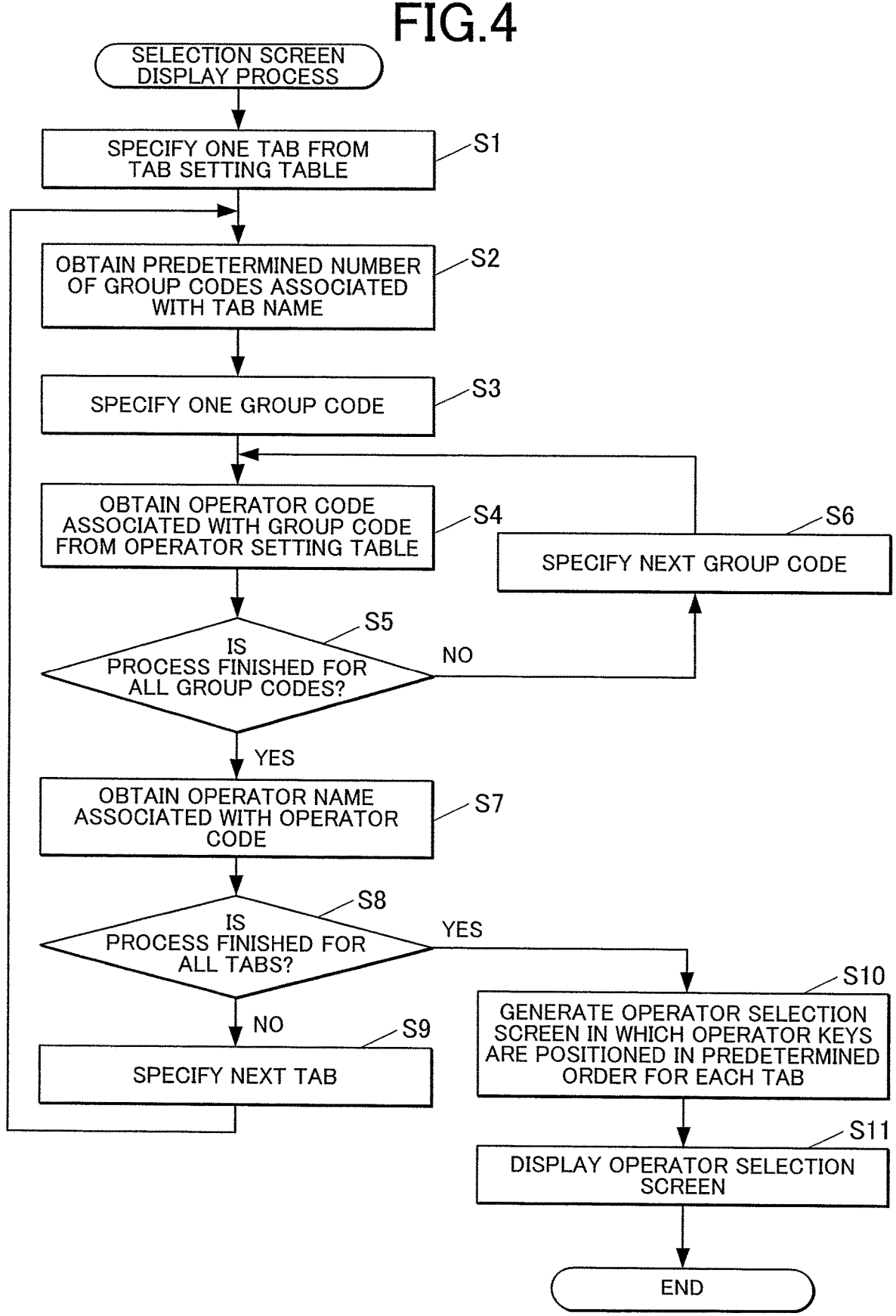
FIG. 4 is a flowchart showing an example of operation of the selection screen display process shown in FIG. 3.

FIG. 4 is a flowchart showing an example of operation regarding the selection screen display process.

A setting process (operator setting process, group setting process, tab setting process) is performed before the selection screen display process described below.

That is, the "operator code", the "operator name", and the "group code" are registered in the operator setting table 3a associated with each other for each operator. The "group code", the "group name", the "display priority", and the "restriction item" are registered in the group setting table 3b associated with each other for all of the operator groups. The "tab name" and the "group code" are registered in the tab setting table 3c associated with each other for each tab T composing the operator selection screen G.

As shown in FIG. 4, first, the CPU 1 reads the tab ing table 3c from the table storage 3, and specifies the tab T associated with any one of the "tab name" (for example, "general employee", etc.) among the "tab name" registered in the tab setting table 3c (step S1). Next, the CPU 1 obtains the predetermined number of "group code" (for example, when the "tab name" is "general employee", "0001" registered in "code 1", etc.) associated with the "tab name" of the specified tab T (step S2).

Next, the CPU 1 specifies any one of the "group code" (for example, "0001", etc. registered in "code 1") from the obtained predetermined number of "group code" (step S3). Next, the CPU 1 reads the operator setting table 3a from the table storage 3 and obtains the "operator code" associated with the specified "group code" (for example, when the "group code" is "0001", "000011" and "000012", etc.) from the operator setting table 3a (step S4).

The CPU 1 determines whether the process to obtain the "operator code" is finished for all "group code" obtained in step S2 (step S5).

When it is determined that the process to obtain the "operator code" is not finished for all "group code" (step S5; NO), the CPU 1 specifies the next "group code" (for example, "code 2", etc.) from the predetermined number of "group code" obtained in step S2 (step S6).

Next, the CPU 1 advances the process to step S4, and similar to the above, obtains the "operator code" associated with the specified "group code" from the operator setting table 3a (step S4).

In step S5, when it is determined that the process to obtain the "operator code" is finished for all "group code" (step S5; YES), the CPU 1 obtains the "operator name" associated with the obtained "operator code" (for example, when the "operator code" is "000011" and "000012", "A" and "G", etc.) from the operator setting table 3a (step S7).

Then, the CPU 1 determines whether the process to obtain the "operator name" is finished f or tabs T of all "tab name" registered in the tab setting table 3c (step S8).

In step S8, when it is determined that the process to obtain the "operator name" in tabs T of all "tab name" is not finished (step S8; NO), the CPU 1 specifies the tab T associated with the next "tab name" (for example, "part-timer", "administrator", etc.) from the "tab name" registered in the tab setting table 3c (step S9). Next, the CPU 1 advances the process to step S2 and the process thereafter is performed.

For example, when the tab T with the "tab name" associated with "administrator" is specified, the CPU 1 obtains the predetermined number of "group code" (for example, "1000" registered in "code 1", "0003" registered in "code 2", and "9000" registered in "code 3", etc.) associated with the "tab name" of the specified tab T in the process of step S2 (step S2). Then, the CPU 1 performs the process of steps S3 to S6, and obtains the "operator code" associated with all "group code" (for example, when the "group code" is "1000", "009001", when the "group code" is "0003", "000301" and "000310", when the "group code" is "9000", "010001", etc.). Then, the CPU 1 obtains the "operator name" (for example, when the "operator code" is "009001", "000301", "000310", and "010001", "C", "D", "F", "G", etc.) associated with the obtained "operator code" in the process of step S7.

In step S8, when it is determined that the process to obtain the "operator name" is finished for tabs T of all "tab name" (step S8; YES), the CPU 1 generates data of the operator selection screen G with the operator key (for example, when the "tab name" is "general employee", operator key of "A" and "G") displaying the obtained "operator name" for each tab T corresponding to all "tab name" registered in the tab setting table 3c positioned in a predetermined order (step S10).

Then, the CPU 1 outputs the data of the generated operator selection screen G to the display 5, and displays the operator selection screen G on the display 5 (step 11; see FIG. 4).

In the operator selection screen G, the operator touches the desired tab T (for example, when the operator is "general employee", the tab T with the "tab name" including "general employee") and the operator keys showing all of the operators belonging to the operator group associated with the tab T are displayed. Then, each operator operates the operator key showing the operator himself to sign on to the apparatus.

As described above, according to the sales data processing apparatus 100 of the present embodiment, the operator group is associated with each operator according to a predetermined condition, and the predetermined number of operator groups are associated with each tab T displayed on the display 5. With this, for example, based on the set contents, the operator selection screen G to select the operator who signs on is automatically generated and displayed on the display 5.

That is, for example, when the operator who operates the sales data processing apparatus 100 is added or deleted, instead of conventional troublesome operation, the operator setting process which associates the operator group with each operator is performed. Here, the new operator is newly associated with an operator group and an existing operator is deleted by canceling the relation between the operator and the operator group.

When the operator group needs to be added or deleted due to change in authority of the operator, instead of the conventional troublesome operation, the tab setting process which associates the predetermined number of operator groups with each tab T is performed. Here, the new operator group is newly associated with the tab T, and the existing operator group is deleted by canceling the relation between the operator group and the tab T.

As described above, the operator selection screen. G to select the operator who operates the apparatus can be easily generated by simply performing the operator setting process and the tab setting process.

The condition regarding the display in the associated tab T is set for each operator group. For example, when the tab T is associated with a plurality of operator groups, the position and the manner that the key showing the operator belonging to the operator group of the tab T can be set, and the ease of operation and viewing of the operator selection screen G can be enhanced.

As for the predetermined number of operator groups associated with the tab T, the "tab name" displayed in the tab T is set. The operator is able to identify the predetermined number of operator groups associated with each tab T by using the "tab name". With this, the ease of operation of the operator selection screen G can be enhanced.

The operator selection screen G with the operator key showing the operator composing the predetermined number of operator groups associated with each tab T positioned in a predetermined order is generated and displayed on the display 5.

With this, for example, the operator can touch the tab T associated with the operator group to which the operator is associated and touch the operator key to which the operator is associated using the operator selection screen G displayed on the display 5 and sign on the apparatus.

The present invention is not limited to the above-described embodiments and various modifications and changes in design can be made without leaving the scope of the invention.

For example, according to the above-described embodiment, a predetermined number of operator groups are associated with each tab T composing the operator selection screen G in the setting process. Alternatively, for example, as shown in FIG. 5, a predetermined number of operator groups can be associated with each screen displayed on the display 5.

That is, the CPU 1 reads the setting program 4a from the program storage 4, and performs the screen setting process to associate the predetermined number of operator groups for each screen displayed on the display 5 according to the setting program 4a.

The screen setting process is performed instead of the tab setting process of the present embodiment. That is, instead of the tab setting table 3c, a screen setting table (not shown) is used, and instead of the "tab name", the display name of the screen displayed on the display 5 is associated with the predetermined number of operator groups. Other than the above, the process is similar to the present embodiment and detailed description is omitted. Similar to the present embodiment, the condition (for example, "display priority", etc.) regarding the display on each screen of the operator selection screen G can be set for each operator group in the group setting process.

Figure 5:
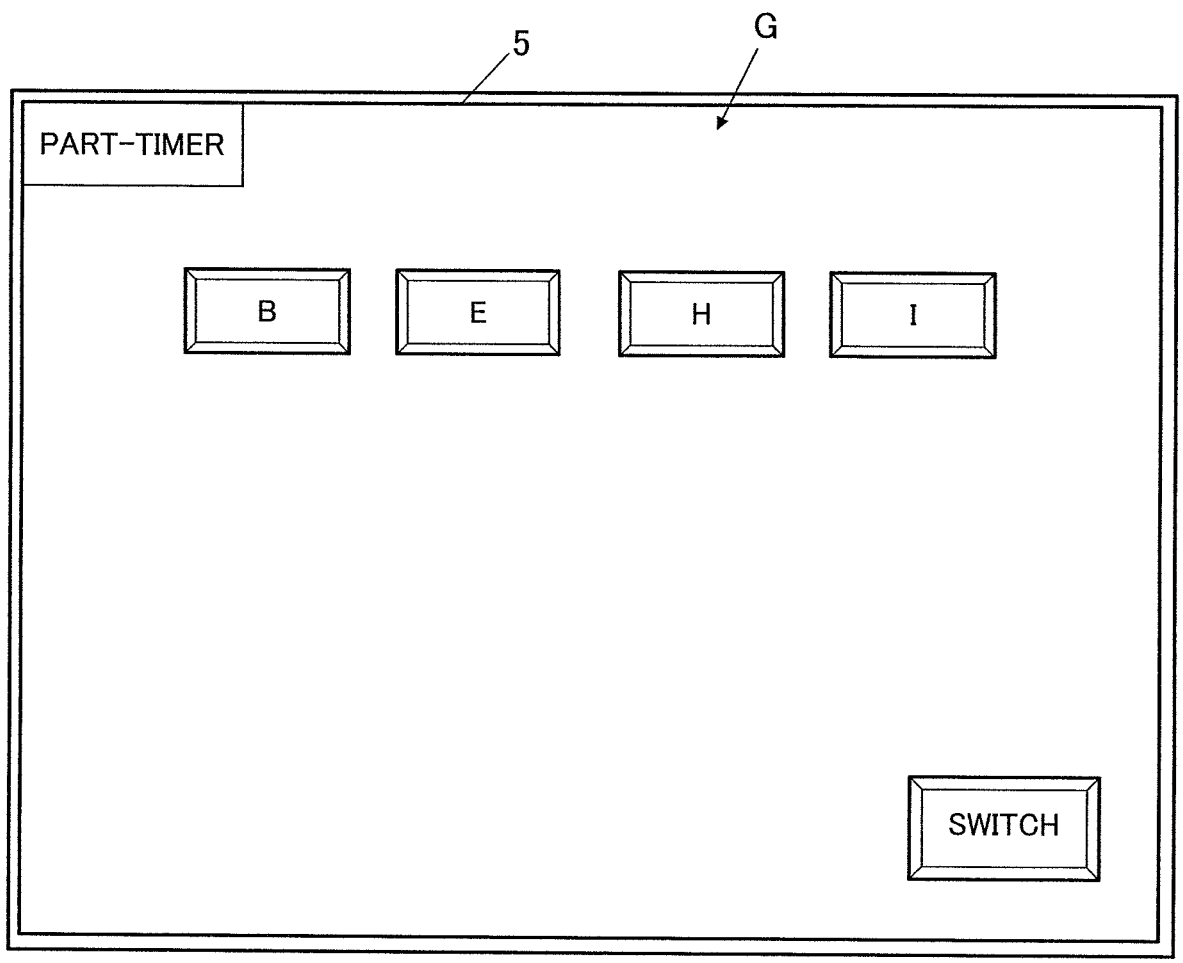
FIG. 5 is a diagram schematically showing a modification of an operator selection screen.

The CPU 1 reads the operator setting table 3a and the screen setting table in the selection screen display process performed in coordination with the display control program 4b, and generates the operator selection screen G with the operator key showing the operator composing the predetermined number of operator groups associated in the setting process positioned in a predetermined order and displays each screen on the display 5 (see FIG. 5).

FIG. 5 is a diagram schematically showing the modification of the operator selection screen G displayed on the display 5.

The operator selection screen G shown in FIG. 5 positions the operator keys showing "B", "E", "H", and "I" who are "part-timer" in the screen with the display name "part-timer". As described in the above-described embodiment, the "display priority" is not registered in the group setting table 3b for the "part-timer". Therefore, the operator key is positioned from the top left toward the right direction in order from the "operator code" with the smaller number.

In the position of the bottom right of the operator selection screen G, the switch key is provided to switch to screens with the display name "general employee", "part-timer", and "administrator". Each time the operator touches the switch key, the screen switches in the order of "general employee", "part-timer", and "administrator".

Therefore, the setting to associate the operator group according to a predetermined condition for each operator is performed and the predetermined number of operator groups are associated with each screen displayed on the display 5. With this, for example, based on the setting contents, the operator selection screen G to select the operator who signs on the apparatus can be automatically generated and displayed on the display 5. Consequently, the operator selection screen G to select the operator who operates the apparatus can be easily generated.

According to the above-described embodiment, the "display priority" is described as an example of the condition regarding the display in the tab T in the operator selection screen G for each operator group set in the setting process. This is merely one example, and the embodiment can be suitably modified. For example, the specific position and style of display can be set and registered in the group setting table 3b.

According to the above-described embodiment, the condition (for example, "display priority") regarding the display in each tab T or each screen in the operator selection screen G is set for each operator group in the group setting process. This is merely one example, and the condition regarding the display does not have to be set.

The configuration of the above-described sales data processing apparatus 100 is merely one example, and the configuration is not limited to the above.

For example, functions such as the setting unit which performs setting to associate the operator group with each operator according to predetermined conditions and setting to associate the predetermined number of operator groups with each tab T or screen displayed on the display 5 and the display control unit which generates and displays on the display 5 the operator selection screen G to select the operator who operates the sales data processing apparatus 100 based on the setting contents set by the setting unit are realized by the CPU 1 performing predetermined programs. However, the configuration is not limited to the above, and for example, the configuration can be realized by a setting unit and a display control unit structured from a predetermined logic circuit (both not shown).

In addition to the ROM and the hard disk, nonvolatile memory such as a flash memory or a portable recording medium such as a CD-ROM can be applied as the computer-readable storage medium storing the program to perform each process. As the medium providing the data of the program through predetermined communication lines, a carrier wave can be applied.

This application is based upon and claims the benefit of priority from the prior Japanese Patent Application No. 2015-186902, filed Sep. 24, 2015, the entire contents of which are incorporated herein by reference.

What is claimed is:

1. A sales data processing apparatus comprising:
   a touch panel display which is configured to detect a touch operation on a display screen;
   a memory which stores at least one group attribute corresponding to a display tab, for each of a plurality of display tabs displayable on the display screen, and a plurality of items of operator information with a group attribute associated with each of the items of operator information; and
   a processor which is configured to perform operations including:
      referring to the memory to display, on the display screen, a plurality of tab groups, each of the plurality of tab groups comprising a plurality of the display tabs as a plurality of first selection buttons, each of the plurality of first selection buttons being operable to select one of the tabs, wherein each of the displayed plurality of tab groups includes the same plurality of display tabs;
      in response to a selection of one of the tabs in one of the tab groups by a touch operation with respect to one of the first selection buttons on the touch panel display, referring to the memory to display, on the display screen, an operator selection list associated with the tab group including the selected tab, the operator selection list including a plurality of second selection buttons corresponding to items of operator information that are associated in the memory with the at least one group attribute corresponding to the selected one of the tabs; and
      in response to a selection of one of the items of operator information by a touch operation with respect to one of the second selection buttons on the touch panel display, perform a sign on operation with respect to an operator corresponding to the selected second selection button, to sign on the operator corresponding to the second selection button with an authority level assigned in advance;
   wherein the group attribute indicates at least one of an employment status and a job role of the operator.

2. The sales data processing apparatus according to claim 1, wherein:
   the memory stores priority information in association with each of the items of operator information; and
   the processor displays the plurality of second selection buttons in the operator selection list in a display priority order based on the priority information associated with the items of operator information.

3. The sales data processing apparatus according to claim 1, wherein:
   the memory stores a first information table and a second information table;
   the first information table stores the at least one group attribute corresponding to the display tab for each of the plurality of display tabs displayable on the display screen;
   the second information table stores the group attribute associated with each of the items of operator information; and
   the first information table and the second information table can be updated separately.

4. An operator selection method executed in a sales data processing apparatus including a touch panel display which is configured to detect a touch operation on a display screen, and a memory which stores at least one group attribute corresponding to a display tab, for each of a plurality of display tabs displayable on the display screen, and a plurality of items of operator information with a group attribute associated with each of the items of operator information, the method comprising:
   referring to the memory to display, on the display screen, a plurality of tab groups, each of the plurality of tab groups comprising a plurality of the display tabs as a plurality of first selection buttons, each of the plurality of first selection buttons being operable to select one of the tabs, wherein each of the displayed plurality of tab groups includes the same plurality of display tabs;
   in response to a selection of one of the tabs in one of the tab groups by a touch operation with respect to one of the first selection buttons on the touch panel display, referring to the memory to display, on the display screen, an operator selection list associated with the tab group including the selected tab, the operator selection list including a plurality of second selection buttons corresponding to items of operator information that are associated in the memory with the at least one group attribute corresponding to the selected one of the tabs; and
   in response to a selection of one of the items of operator information by a touch operation with respect to one of the second selection buttons on the touch panel display, perform a sign on operation with respect to an operator corresponding to the selected second selection button, to sign on the operator corresponding to the second selection button with an authority level assigned in advance;

wherein the group attribute indicates at least one of an employment status and a job role of the operator.

5. The operator selection method according to claim 4, wherein:
   the memory stores priority information in association with each of the items of operator information; and
   the method comprises displaying the plurality of second selection buttons in the operator selection list in a display priority order based on the priority information associated with the items of operator information.

6. The operator selection method according to claim 4, wherein:
   the memory stores a first information table and a second information table;
   the first information table stores the at least one group attribute corresponding to the display tab for each of the plurality of display tabs displayable on the display screen;
   the second information table stores the group attribute associated with each of the items of operator information; and
   the first information table and the second information table can be updated separately.

7. A non-transitory computer-readable storage medium having a program stored thereon that is executable by a computer in a sales data processing apparatus including a touch panel display which is configured to detect a touch operation on a display screen, and a memory which stores at least one group attribute corresponding to a display tab, for each of a plurality of display tabs displayable on the display screen, and a plurality of items of operator information with a group attribute associated with each of the items of operator information, the program being executable to control the computer to perform functions comprising:
   referring to the memory to display, on the display screen, a plurality of tab groups, each of the plurality of tab groups comprising a plurality of the display tabs as a plurality of first selection buttons, each of the plurality of first selection buttons being operable to select one of the tabs, wherein each of the displayed plurality of tab groups includes the same plurality of display tabs;
   in response to a selection of one of the tabs in one of the tab groups by a touch operation with respect to one of the first selection buttons on the touch panel display, referring to the memory to display, on the display screen, an operator selection list associated with the tab group including the selected tab, the operator selection list including a plurality of second selection buttons corresponding to items of operator information that are associated in the memory with the at least one group attribute corresponding to the selected one of the tabs; and
   in response to a selection of one of the items of operator information by a touch operation with respect to one of the second selection buttons on the touch panel display, perform a sign on operation with respect to an operator corresponding to the selected second selection button, to sign on the operator corresponding to the second selection button with an authority level assigned in advance;
   wherein the group attribute indicates at least one of an employment status and a job role of the operator.

8. The non-transitory computer-readable storage medium according to claim 7, wherein:
   the memory stores priority information in association with each of the items of operator information; and
   the functions comprise displaying the plurality of second selection buttons in the operator selection list in a display priority order based on the priority information associated with the items of operator information.

9. The non-transitory computer-readable storage medium according to claim 7, wherein:
   the memory stores a first information table and a second information table;
   the first information table stores the at least one group attribute corresponding to the display tab for each of the plurality of display tabs displayable on the display screen;
   the second information table stores the group attribute associated with each of the items of operator information; and
   the first information table and the second information table can be updated separately.

* * * * *